(12) United States Patent
Kim

(10) Patent No.: US 8,813,106 B2
(45) Date of Patent: Aug. 19, 2014

(54) METHOD AND SYSTEM FOR ELECTRONIC COMMERCE USING INTERNET PROTOCOL TELEVISION (IPTV) AND MOBILE TERMINAL

(75) Inventor: Hwan-joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/098,442

(22) Filed: Apr. 6, 2008

(65) Prior Publication Data

US 2009/0172765 A1 Jul. 2, 2009

(30) Foreign Application Priority Data

Dec. 27, 2007 (KR) .................. 10-2007-0138980

(51) Int. Cl.
*H04N 7/16* (2011.01)
*H04N 5/44* (2011.01)
*H04N 7/18* (2006.01)
*H04N 7/173* (2011.01)
*G06F 3/00* (2006.01)
*G06F 13/00* (2006.01)

(52) U.S. Cl.
USPC ............ 725/5; 725/1; 725/2; 725/25; 725/30; 725/60; 725/61; 725/37; 725/74; 725/80; 725/86; 725/104; 725/135; 725/136

(58) Field of Classification Search
USPC .......................................... 725/87
See application file for complete search history.

(56) References Cited

U.S. PATENT DOCUMENTS

| | | | | |
|---|---|---|---|---|
| 5,986,690 A * | 11/1999 | Hendricks | ....................... 725/60 |
| 7,387,250 B2 * | 6/2008 | Muni | ....................... 235/462.01 |
| 7,707,599 B1 * | 4/2010 | Groff et al. | ....................... 725/5 |
| 2002/0059637 A1 * | 5/2002 | Rakib | ....................... 725/119 |
| 2002/0107790 A1 * | 8/2002 | Nielson | ....................... 705/38 |
| 2003/0005136 A1 * | 1/2003 | Eun | ....................... 709/229 |
| 2005/0125301 A1 | 6/2005 | Muni | |
| 2005/0282582 A1 * | 12/2005 | Slotznick | ....................... 455/557 |
| 2008/0092181 A1 * | 4/2008 | Britt | ....................... 725/87 |
| 2008/0229372 A1 * | 9/2008 | White | ....................... 725/91 |

FOREIGN PATENT DOCUMENTS

| | | |
|---|---|---|
| KP | 10-2003-0083968 | 11/2003 |
| KP | 10-2005-0012360 | 2/2005 |
| KP | 10-2006-0008484 | 1/2006 |
| KP | 10-2007-0021741 | 2/2007 |
| KR | 10-2006-0069817 A | 6/2006 |
| KR | 10-2007-0000379 | 1/2007 |
| KR | 10-2007-0109441 A | 11/2007 |

* cited by examiner

*Primary Examiner* — Justin Shepard
(74) *Attorney, Agent, or Firm* — NSIP Law

(57) ABSTRACT

An electronic commerce method and system using an Internet Protocol Television (IPTV) and a mobile terminal are provided. In an electronic commerce method and system, an IPTV or mobile terminal transmits binding information to a server where a purchaser selects product information, the server determines a purchaser authority using the received binding information, and transmits sales information for the selected product information to the mobile terminal in response to the purchase authority being valid, and the mobile terminal makes an offer to purchase the product to the server using the received sales information.

21 Claims, 6 Drawing Sheets

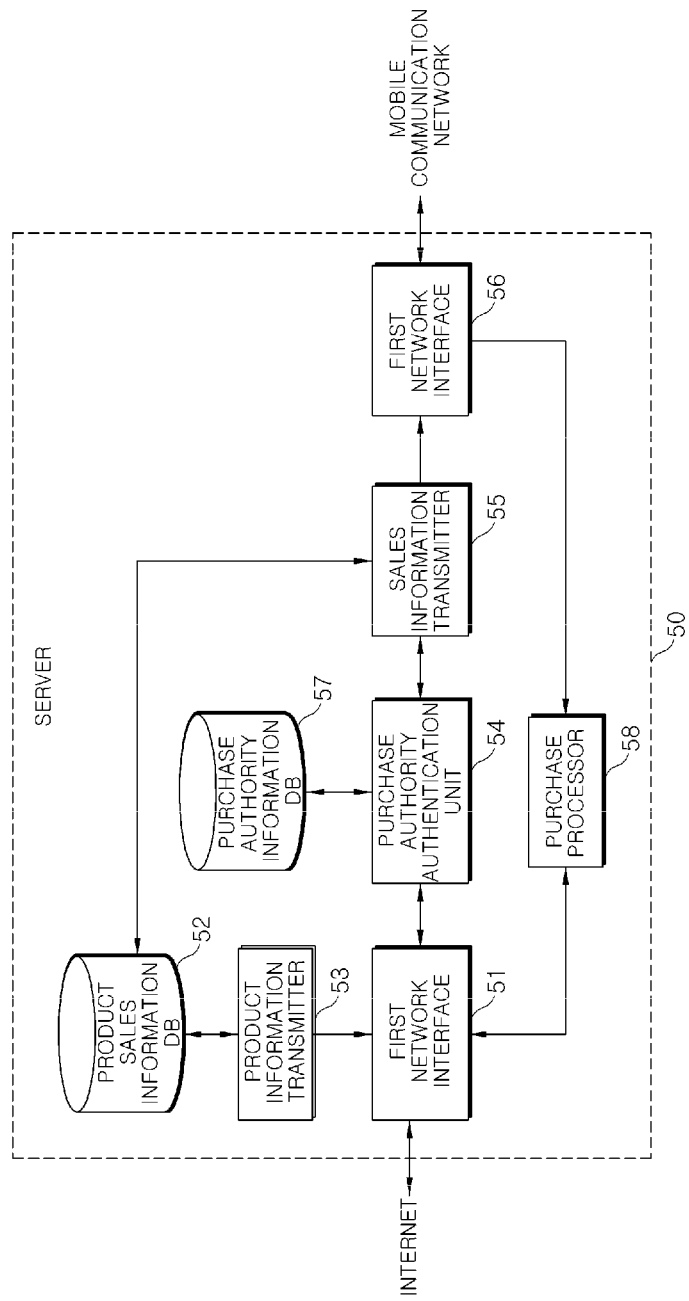

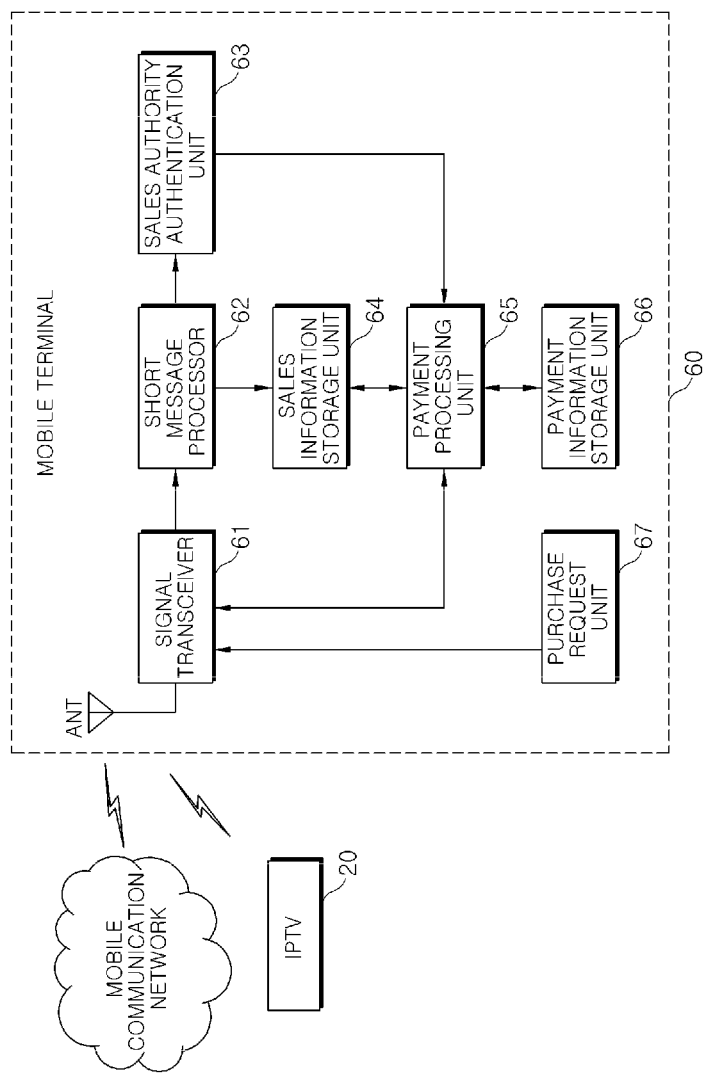

METHOD AND SYSTEM FOR ELECTRONIC COMMERCE USING INTERNET PROTOCOL TELEVISION (IPTV) AND MOBILE TERMINAL

CROSS REFERENCE TO RELATED APPLICATIONS

This application claims the benefit under 35 U.S.C. §119(a) of a Korean Patent Application No. 10-2007-0138980, filed on Dec. 27, 2007, the disclosure of which is incorporated herein in its entirety by reference.

TECHNICAL FIELD

The following description relates to a technology for an electronic commerce service, and more particularly, to a method and system for electronic commerce using an Internet Protocol Television (IPTV) and a mobile terminal.

BACKGROUND

In general, a television commerce (T-commerce) service displays a broadcasting program and a product advertisement on the screen of an Internet Protocol Television (IPTV), and allows a user to select and purchase a product.

However, since such a T-commerce service allows a user to select a product while watching a broadcasting program, the watching of the broadcasting program may be interrupted.

Meanwhile, a product may be selected using a remote controller while watching a broadcasting program, and payment information required to purchase the selected product may be input through an extra input apparatus, for example, through a keyboard. However, it is inconvenient for a user to input the payment information through the extra input apparatus whenever he or she purchases a product. The payment information may be the user's resident registration number, the user's credit card number, etc.

The payment information required to purchase the product is transferred to a server which sells the product. However, if the server which sells the product is accessed or managed by a malicious person, personal information included in the payment information may be compromised.

SUMMARY

In one general aspect, there is provided an electronic commerce method and system for providing an electronic commerce service using an Internet Protocol Television (IPTV) and a mobile terminal, which prevents interruptions in purchasing a product through an IPTV while watching a broadcasting program through the IPTV, inconvenience in inputting payment information, and compromising of personal information.

In another general aspect, there is provided an electronic commerce method and system using an IPTV and a mobile terminal, which allows the mobile terminal to acquire sales information about a product selected through the IPTV, using a short message service or a barcode, and to make an offer to purchase the product using the sales information.

In yet another aspect, there is provided an Internet Protocol Television (IPTV) set-top box including a receiver receiving purchaser identification information and product information selected through the IPTV, from a remote controller or a mobile terminal, a binding unit binding the product information, purchaser information, and identification information of the IPTV to create binding information, and a transmitter transmitting the binding information to a server.

In still another aspect, there is provided a mobile terminal including a purchase request unit transmitting product information selected through an Internet Protocol Television (IPTV) to the IPTV or a server, a sales authority authentication unit determining a product sales authority using sales information of a product received from the server, and a payment processing unit making an offer to purchase the product to the server, using the sales information and prestored payment information, in response to the product sales authority being valid.

In still yet another aspect, there is provided a server including an authentication unit determining a purchase authority using binding information received from an Internet Protocol Television (IPTV) or a mobile terminal where a purchaser selects a product, a sales information transmitting unit transmitting sales information for the selected product to the mobile terminal in response to the purchase authority being valid, and a purchase processing unit receiving a purchase request message from the mobile terminal where payments for the product are complete, and performing processing for sending the product for which the payments are complete.

In yet another aspect, there is provided an electronic commerce method of an Internet Protocol Television (IPTV) set-top box, including receiving purchaser identification information and product information selected through the IPTV from a remote controller or a mobile terminal, binding the product information, purchaser information corresponding to the purchaser identification information, and identification information of the IPTV to create binding information, and transmitting the binding information to a server.

In still another aspect, there is provided an electronic commerce method of a mobile terminal, including transmitting purchaser identification information and product information selected through an Internet Protocol Television (IPTV) to the IPTV, or transmitting the selected product information and purchaser information to a server, determining a product sales authority, using product sales information which is received from the server, and making an offer to purchase the product to the server, using the sales information and prestored payment information, in response to the product sales authority being valid.

Other features will become apparent to those skilled in the art from the following detailed description, which, taken in conjunction with the attached drawings, discloses general aspects of the invention.

BRIEF DESCRIPTION OF THE DRAWINGS

FIG. 5 is a block diagram illustrating a server according to a general aspect.

FIG. 6 is a block diagram illustrating a mobile terminal according to a general aspect.

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and systems described herein. Accordingly, various changes, modifications, and equivalents of the systems, apparatuses and methods described herein will be suggested to those of ordinary skill in the art. Also, descriptions of well-known functions and constructions are omitted to increase clarity and conciseness.

Figure 1:
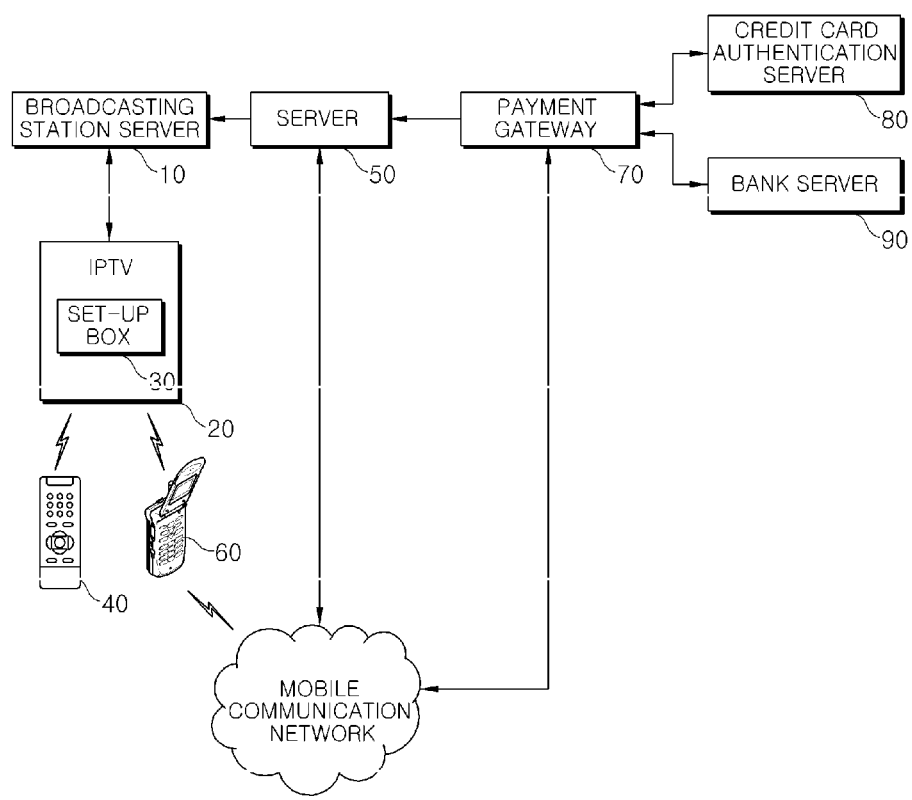
FIG. 1 is a block diagram illustrating an electronic commerce system according to a general aspect.

FIG. 1 illustrates an electronic commerce system using an Internet Protocol Television (IPTV) 20 and a mobile terminal 60, according to a general aspect.

As illustrated in FIG. 1, the electronic commerce system allows the mobile terminal 60 to acquire sales information about a product displayed on the IPTV 20, using, for example, a short message or barcode, and to make an offer to purchase the product to a server 50 using the sales information.

According to an aspect, the electronic commerce system may acquire sales information about a product using a short message, and perform electronic commerce transactions using the sales information. The electronic commerce system includes the IPTV 20, the server 50, and the mobile terminal 60.

The IPTV 20 receives a broadcasting program and product information from a broadcasting station server 10, displays the broadcasting program and product information on a screen, and transmits to a set-top box 30 a purchaser's identification information and production information selected by a remote controller 40 or by the mobile terminal 60. Thus, the set-top box 30 binds the selected product information, identification information of the IPTV 20, and purchaser information corresponding to the purchaser's identification information to create binding information, and transmits the binding information to the server 50. Here, the server 50 may be a shopping mall server. The purchaser's identification information may be a number corresponding to the purchaser information. Also, the purchaser information may be the purchaser's resident registration number, the purchaser's address, the purchaser's credit card number, or an identification number of the mobile terminal 60. The identification information of the IPTV 20 may be a hardware identification number (ID) of the set-top box 30. However, it is not limited thereto. Also, the set-top box 30 and the IPTV 20 may be packaged into a single unit, or may be implemented as separate units. The set-top box 20 may receive and store the purchaser's identification information and purchaser's information from the remote controller 40 or the mobile terminal 60, in advance, before receiving the purchaser's identification information. Also, the set-top box 20 may store the binding information transmitted to the server 50.

The mobile terminal 60 may bind product information selected by a user and purchaser information, to create binding information, and transmit the binding information directly to the server 50 through a mobile communication network. That is, the mobile terminal 60 may bind product information selected by a user and purchaser information, directly, not via the IPTV 20, to create binding information, and transmit the binding information to the server 50 through a mobile communication network. The purchaser information may be, for example, at least one of the purchaser's resident registration number, the purchaser's address, the purchaser's credit card number, and the identification number of the mobile terminal 60.

The server 50 determines a purchasing authority of the IPTV 20 or the mobile terminal 60, using the binding information which is received from the mobile terminal 60 through the IPTV 20 or through the mobile communication network, and transmits sales information about the selected product to the mobile terminal 60, using a short message, in response to the IPTV 20 or the mobile terminal 60 having a valid purchasing authority. At this point, the server 50 may determine the purchasing authority using the hardware ID of the set-top box 30 among the binding information received from the IPTV 20. Also, the server 50 may determine the purchasing authority using the identification number of the mobile terminal 60 among the binding information received from the mobile terminal 60. However, it is not limited to these examples, and the server 50 may determine the purchasing authority using any other arbitrary information.

The mobile terminal 60 makes an offer to purchase the selected product to the server 50 using the sales information received from the server 50. That is, the mobile terminal 60 determines a sales authority of the server 50 using the received sales information. If the server 50 has a valid sales authority, the mobile terminal 60 makes an offer to purchase the product to the server 50 using the sales information and payment information stored in advance in the mobile terminal 60, and makes payments for purchasing the product through a payment gateway 70.

The electronic commerce system may further include the broadcasting station server 10, the payment gateway 70, a credit card authentication server 80, and a bank server 90. The broadcasting station server 10 transmits the product information received from the server 50 to the IPTV 20, while transmitting a broadcasting program. The payment gateway 70 accesses the credit card authentication server 80 or the bank server in response to a payment request from the mobile terminal 60, so that payment may be made to purchase.

According to another aspect, the electronic commerce system may acquire sales information about a product in the form of a barcode, and perform electronic commerce transactions using the sales information. The electronic commerce system includes an IPTV, a server, and a mobile terminal, wherein the constructions and operations of the IPTV, the server, and the mobile terminal may be implemented by modifying some of the constructions and operations of the IPTV 20, the server 50, and the mobile terminal 60 illustrated in FIG. 1. Also, the electronic commerce system may be applied to an electronic commerce service using a barcode, without modifying the constructions and operations of the payment gateway 70, the credit card authentication server 80, and the bank server 90 illustrated in FIG. 1.

The IPTV displays on its screen a broadcasting program and sales information about a product that are received from a broadcasting station server. The sales information about the product may be displayed in the form of a barcode. According to another exemplary embodiment, the IPTV 20 illustrated in FIG. 1 displays on its screen a broadcasting program and product information that are received from the broadcasting server 10. In other words, the server provides sales information about a product in the form of a barcode to the broadcasting station server, and the server 50 illustrated in FIG. 1 provides product information to the broadcasting station server 10.

The mobile terminal acquires the sales information about the product displayed on the screen of the IPTV by capturing the sales information using a camera, and determines a sales authority using the sales information. If the sales authority is valid, the mobile terminal makes an offer to purchase the product to the server, using the sales information and prestored payment information. In comparison, the mobile terminal 60 illustrated in FIG. 1 determines a sales authority using sales information included in a short message received from the server 50, and makes an offer to purchase the product to the server 50 using the sales information and prestored payment information if the sales authority is valid.

Figure 2:
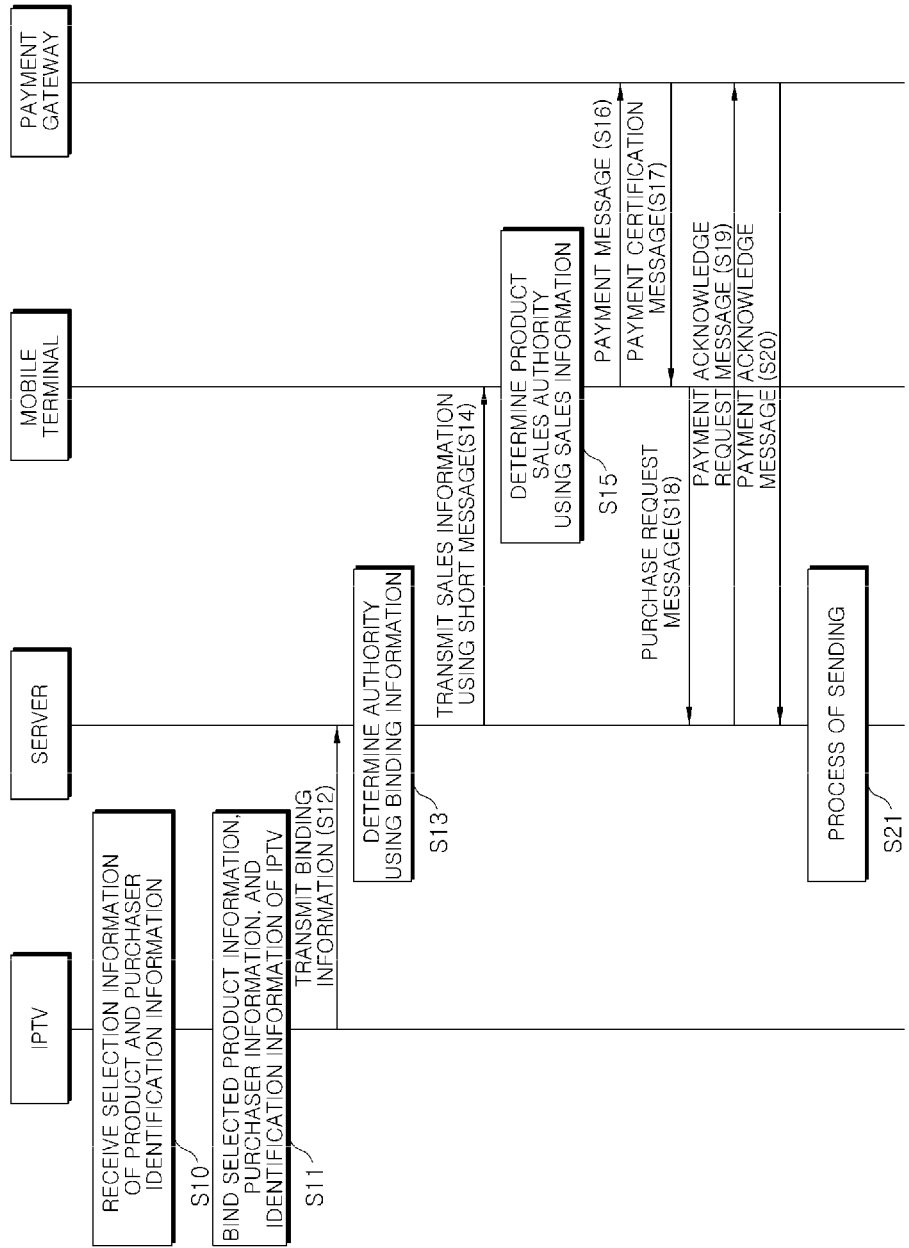
FIG. 2 is a flowchart illustrating an electronic commerce method according to a general aspect.

FIG. 2 illustrates an electronic commerce method using an IPTV and a mobile terminal, according to a general aspect.

As illustrated in FIG. 2, in the electronic commerce method, an IPTV binds its identification information, product information selected through the IPTV, and purchaser information, to create binding information, and transmits the binding information to a server. The server determines a purchasing authority of the mobile terminal using the binding information, and transmits sales information about the selected product included in a short message to the mobile terminal if the mobile terminal has a valid purchasing authority. The mobile terminal makes an offer to purchase the product to the server, using the sales information.

Also, in the electronic commerce method, the mobile terminal binds the product formation selected through the IPTV and the purchaser information, to create binding information, and transmits the binding information directly to the server through a mobile communication network, the server determines a purchasing authority of the mobile terminal using the binding information received from the mobile terminal, and transmits sales information about the selected product information included in a short message to the mobile terminal if the mobile terminal has a valid purchasing authority, and the mobile terminal makes an offer to purchase the product to the server, using the sales information.

Now, in the electronic commerce method, an operation of performing electronic commerce transactions using binding information received from the mobile terminal through the IPTV or through the mobile communication network will be described.

The IPTV displays on its screen a broadcasting program and product information that are received from a broadcasting station server, and receives purchaser identification information and product information selected through a remote controller or through a mobile terminal (operation S10). Here, the purchaser identification information may be a number corresponding to purchaser information. Also, the purchaser information may include at least one of the purchaser's resident registration number, the purchaser's address, the purchaser's credit card number, and an identification number of the mobile terminal. The IPTV may receive and store the purchaser identification information and the purchaser information from the remote controller or the mobile terminal, in advance, before receiving the purchaser identification information.

The IPTV binds the selected product information, the purchaser information, and the IPTV's identification information to create binding information (operation S11), and transmits the binding information to the server (operation S12). The IPTV's identification information may be a hardware ID of a set-top box of the IPTV. However, the IPTV's identification information may be any other authorized and/or authorizable information. The reason for binding the hardware ID of the set-top box is, for example, to easily determine whether the set-top box is a rental set-top box because a set-top box is generally rented and installed. Also, the IPTV may store the binding information which is transmitted to the server, in order to provide convenience when a user reorders the corresponding product.

Meanwhile, the server may receive the binding information from the mobile terminal through the mobile communication network, which is not illustrated in FIG. 2. The binding information received through the mobile communication network may include product information selected through the IPTV and purchaser information. The purchaser information may include, for example, at least one of the purchaser's resident registration number, the purchaser's address, the purchaser's credit card number, and an identification number of the mobile terminal.

The server determines a purchasing authority of the mobile terminal using the binding information received from the IPTV (operation S13), and transmits sales information about the selected product information included in a short message to the mobile terminal if the purchasing authority is valid (operation S14). The server may determine the purchasing authority by determining whether the hardware ID of the set-top box among the binding information received from the IPTV is equal to a prestored hardware ID of the set-top box. If the received hardware ID of the set-top box is equal to the prestored hardware ID of the set-top box, the server determines that the IPTV has a valid purchasing authority.

The server may determine the purchasing authority of the mobile terminal, using the mobile terminal's identification number among the binding information received from the mobile terminal through the mobile communication network. If the mobile terminal's identification number is equal to a prestored identification number of the mobile terminal, the server determines whether the mobile terminal has a valid purchasing authority. However, the server may determine the purchasing authority using any other authorized information. Through the determination of the purchasing authority, it is possible to protect the server from Denial of Service (DoS) attacks.

The mobile terminal determines a sales authority of the server using the sales information included in a short message received from the server (operation S15). The sales information may include product information, information about a payment method, and authentication information of the server. However, the sales information may include any other information. That is, the mobile terminal determines a sales authority of the server by determining whether the server's authentication information included in the sales information is equal to the server's authentication information stored in advance in the mobile terminal. That is, the mobile terminal determines that the server has a valid sales authority if the server's authentication information included in the sales information is equal to the server's authentication information stored in advance in the mobile terminal, and determines that the server does not have a valid sales authority if the server's authentication information included in the sales information is different from the server's authentication information stored in advance in the mobile terminal.

Then, if the server has a valid sales authority, the mobile terminal creates payment information for the selected product, using the information about the payment method included in the sales information, and payment information stored in advance in the mobile terminal, and transmits the created payment information to the payment gateway (operation S16).

The information about the payment method, which is information about a payment method to purchase the product, may be a mobile payment method. The mobile payment method includes a mobile banking payment method which makes payments through a bank, and a mobile card payment method which makes payments through a card company. The mobile payment method may be any other payment method. The prestored payment information may include a resident registration number, a bank account number, a password, a credit card number, and a credit card password. However, the prestored payment information may be any other information.

Accordingly, the payment information may include the amount to be paid to purchase the product, and a bank account number and password, or include the amount to be paid to purchase the product, and a credit card number and credit card password. The mobile terminal makes payments for purchasing the product using the prestored payment information. Accordingly, a user may not need to input payment information through a separate input apparatus whenever he or she purchases a product.

The payment gateway makes payments to purchase the product in response to a payment message received from the mobile terminal, and includes payment completion information in a payment certification message and transmits the payment certification message to the mobile terminal if the payments are complete (operation S17).

If a bank account number and password are included in the payment message, the payment gateway accesses a bank server and makes payments for purchasing the product through the bank server. If a credit card number and credit card password are included in the payment message, the payment gateway accesses a credit card authentication server and makes payments for purchasing the product along with the credit card authentication server. As such, payments for purchasing a product are made through the payment gateway, not via the server. Accordingly, even when the server is accessed or managed by a malicious user, it is possible to prevent personal information from being compromised when payments are made.

If the mobile terminal receives the payment certification message from the payment gateway, the mobile terminal issues a purchase request message to purchase the selected product, and transmits the purchase request message to the server (operation S18). The purchase request message may include payment completion information. If the server receives the purchase request message from the mobile terminal, the server issues a payment acknowledge request message, and transmits the payment acknowledge request message to the payment gateway (operation S19), and the payment gateway transmits a payment acknowledge message to the server in response to the payment acknowledge request message (operation S20). If the server receives the payment acknowledge message from the payment gateway, the server performs processing for sending the selected product (operation S21).

Figure 3:
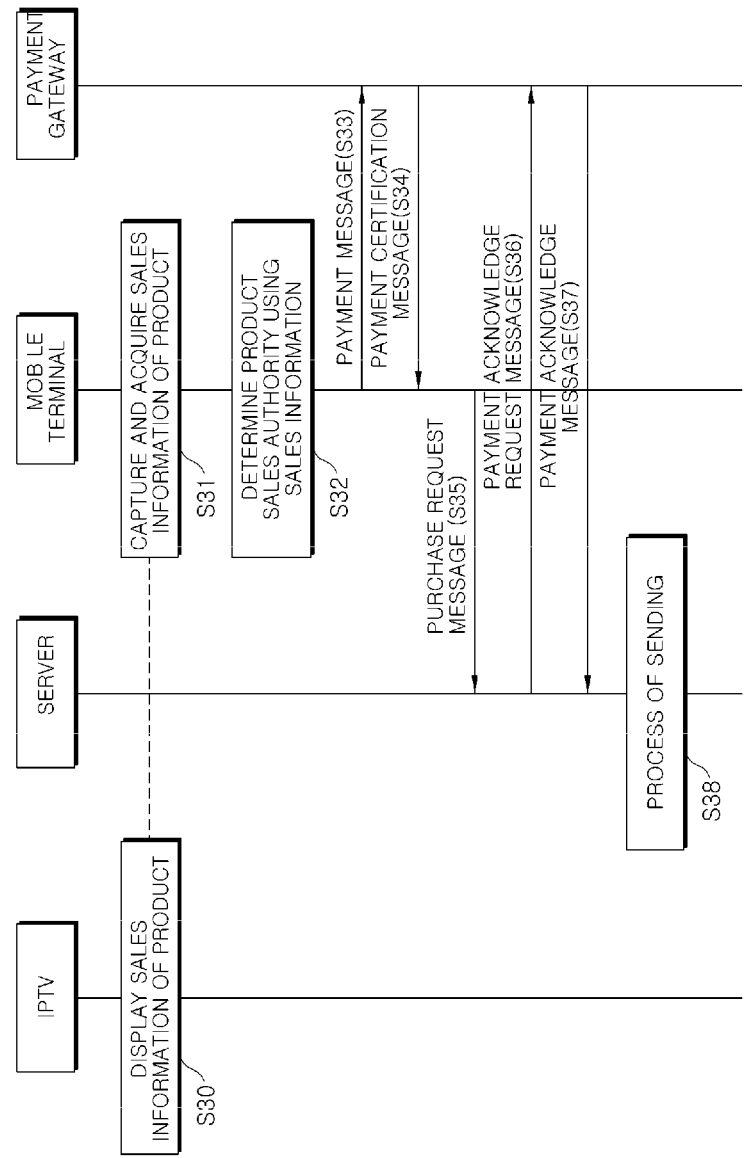
FIG. 3 is a flowchart illustrating an electronic commerce method according to another general aspect.

FIG. 3 illustrates an electronic commerce method using an IPTV and a mobile terminal, according to another general aspect.

As illustrated in FIG. 3, in the electronic commerce method, the mobile terminal captures and acquires sales information of a product displayed on the screen of the IPTV, using a camera, determines a sales authority of a server using the sales information, and if the server has a valid sales authority makes an offer to purchase the product to the server, using the sales information and prestored payment information.

The IPTV displays on the screen a broadcasting program and sales information of a product that are received from a broadcasting station server (operation S30). The mobile terminal captures and acquires sales information displayed on the screen of the IPTV, using a camera (operation S31), and acquires a sales authority of the server using the sales information (operation S32). The sales information may include product information, information about a payment method, and the server's authentication information. However, the sales information may include any other information.

Accordingly, the mobile terminal determines the sales authority of the server by determining whether the server's authentication information included in the sales information is equal to the server's authentication information prestored in the mobile terminal. That is, if the server's authentication information included in the sales information is equal to prestored server's authentication information, the mobile terminal determines that the server has a valid sales authority, and if the server's authentication information included in the sales information is not equal to prestored server's authentication information, the mobile terminal determines that the server does not have a valid sales authority.

If the server has a valid sales authority, the mobile terminal generates payment information for the selected product using the prestored payment information and the information about the payment method included in the sales information, and transmits the payment information to the payment gateway (operation S33).

The payment method may be a mobile payment method. The mobile payment method includes a mobile banking payment method which makes payments through a bank, and a mobile card payment method which makes payments through a card company. However, the mobile payment method is not limited to the above-mentioned payment methods. The payment information may include a resident registration number, a bank account number and password, and a credit card number and credit card password.

Accordingly, the payment information may include the amount to be paid to purchase the product, and a bank account number and password, or include the amount to be paid to purchase the product, and a credit card number and credit card password. As such, the mobile terminal makes payments to purchase the product using the prestored payment information. Accordingly, a user does not need to input payment information through a separate input apparatus whenever he or she purchases a product.

The payment gateway makes payments to purchase the product using a payment message received from the mobile terminal, and includes payment completion information in a payment certification message and transmits the payment certification message to the mobile terminal if the payments are complete (operation S34).

If a bank account number and password are included in the payment message, the payment gateway accesses a bank server and makes payments to purchase the product through the bank server. If a credit card number and credit card password are included in the payment message, the payment gateway accesses a credit card authentication server and makes payments to purchase the product through the credit card authentication server. As such, the payments to purchase the product are made through the payment gateway, not via the server. Accordingly, even where the server is accessed or managed by a malicious user, it is possible to prevent personal information from being compromised when payments are made.

Where the mobile terminal receives a payment certification message from the payment gateway, the mobile terminal issues a purchase request message for the selected product and transmits the purchase request message to the server (operation S35).

The purchase request message may include payment completion information. If the server receives the purchase request message from the mobile terminal, the server generates a payment acknowledge request message and transmits the payment acknowledge request message to the payment gateway (operation S36), and the payment gateway transmits a payment acknowledge message to the server in response to the payment acknowledge request message (operation S37). If the server receives the payment acknowledge message from the payment gateway, the server performs processing for sending the selected product (operation S38).

Figure 4:
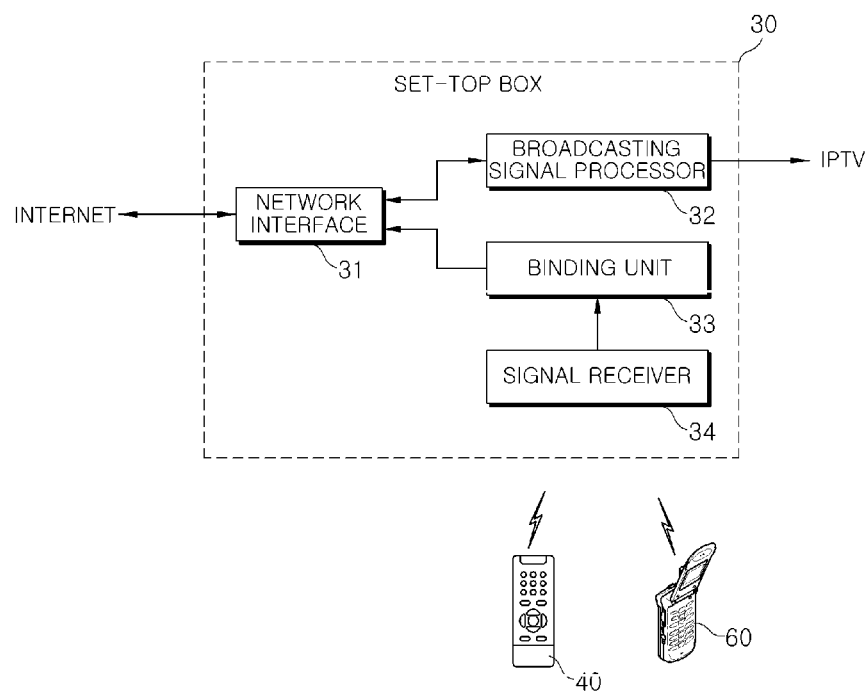
FIG. 4 is a block diagram illustrating a set-top box according to a general aspect.

FIG. 4 illustrates a set-top box of an IPTV, according to a general aspect.

Referring to FIG. 4, the set-top box 30 includes a broadcasting signal processing unit 32, a binding unit 33, a signal receiver 34, and a network interface 31. The network interface 31 interfaces the set-top box 30 with the Internet.

The broadcasting signal processor 32 displays on the screen of the IPTV a broadcasting program and product information that are received from a broadcasting station server. The signal receiver 34 transmits to the binding unit 33 product information selected by a remote controller 40 or by a mobile terminal 60, and purchaser identification information. Also, the signal receiver 34 may transmit to the binding unit 33 the purchaser's identification information and purchaser information through an input from the remote controller 40 or the mobile terminal 60, before receiving the production information and the purchaser's identification information. The purchaser's identification information may be a number corresponding to the purchaser information. The purchaser information may include the purchaser's resident registration number, the purchaser's address, a credit card number, and the mobile terminal's identification number. The set-top box 30 and the IPTV may be packaged into a single unit, or may be implemented as separate units.

The binding unit 33 stores the purchaser's identification information and purchaser's information received from the signal receiver 34 in such a manner that the purchaser's identification information is mapped to the purchaser information, and binds the product information, the purchaser information corresponding to the purchaser identification information, and ID information of the set-top box 30, to create binding information. The network interface 31 transmits the binding information to the server through the Internet. The IPTV's identification information may be a hardware ID of the set-top box 30 of the IPTV. However, the IPTV's identification information may be any other authorized and/or authorizable information. A reason for binding the hardware ID of the set-top box 30 may be to easily determine whether the set-top box 30 is a rental set-top box because a set-top box is generally rented and installed. Also, the binding unit 33 may store the binding information transmitted to the server. Accordingly, it is possible to provide convenience when a user reorders the corresponding product.

The set-top box of the IPTV according to another general aspect displays a broadcasting program and sales information of a product on the screen of the IPTV. The sales information of the product may be displayed in the form of a barcode on the screen of the IPTV. The set-top box of the IPTV according to a general aspect displays a broadcasting program and product information on the screen of the IPTV.

FIG. 5 illustrates a server 50 according to a general aspect.

Referring to FIG. 5, the server 50 includes a purchasing authority authentication unit 54, a sales information transmitter 55, and a purchase processing unit 58. The server 50 may further include a first network interface 51, a product sales information database (DB) 52, a product information transmitter 53, a second network interface 56, and a purchase authority DB 57. The first network interface 51 interfaces the server 50 with the Internet, and the second network interface 56 interfaces the server 50 with a mobile communication network. The product sales information DB 52 stores at least one of product information, payment method information, and authentication information of the server 50. The purchase authority information DB 57 stores information required to determine a purchase authority. The information required to determine the purchase authority may be a hardware ID of at least one set-top box, or a mobile terminal's identification number. However, the information required to determine the purchase authority may be any other authorized and/or authorizable information.

The purchase authority authentication unit 54 determines the purchase authority using binding information which is received from the set-top box of the IPTV or from the mobile terminal through the Internet or through a mobile communication network. The binding information received from the set-top box of the IPTV may include product information selected through the IPTV, identification information of the IPTV, and purchaser information. Accordingly, the binding information received through the set-top box of the IPTV may include product information selected through the IPTV, identification information of the IPTV, and purchaser information. Accordingly, the purchase authority authentication unit 54 determines the purchase authority using the hardware ID of the set-top box prestored in the purchase authority information DB 57 and the hardware ID of the set-top box among the binding information received from the set-top box. That is, the purchase authority authentication information 54 determines that the IPTV has a valid purchase authority if the hardware ID of the set-top box received from the set-top box is equal to the hardware ID of the set-top box prestored in the purchase authority information DB 57, and determines that the IPTV does not have a valid purchase authority if the hardware ID of the set-top box received from the set-top box is not equal to the hardware ID of the set-top box prestored in the purchase authority information DB 57.

Also, the purchase authority authentication unit 54 determines the purchase authority using the binding information received from the mobile terminal. The binding information received from the mobile terminal may include product information selected through the IPTV and purchaser information. The purchaser information may include at least one of the purchaser's resident registration information, the purchaser's address, a credit card number, and the mobile terminal's identification number. Accordingly, the purchase authority authentication unit 54 determines the purchase authority using the received identification number of the mobile terminal and the mobile terminal's identification number prestored in the purchase authority information DB 57, among the binding information received from the mobile terminal. That is, the purchase authority authentication unit 54 determines that the mobile terminal has a valid purchase authority if the mobile terminal's identification number received from the mobile terminal is equal to the mobile terminal's identification number prestored in the purchase authority information DB 57. The purchase authority authentication unit 54 determines that the mobile terminal does not have a valid purchase authority if the mobile terminal's identification number received from the mobile terminal is not equal to the mobile terminal's identification number prestored in the purchase authority information DB 57.

Accordingly, through the authentication of the purchase authority, the server may be protected from DoS attacks of malicious users.

If the IPTV or the mobile terminal has a valid purchase authority, the sales information transmitter 55 creates sales information for the product information, using the information stored in the product sales information DB 52, and transmits the sales information to the mobile terminal included in a short message. The sales information for the product information may include product information, information about a payment method, and the server's authentication information.

If the purchase processing unit 58 receives a purchase request message of a product selected by the mobile terminal, the purchase processing unit 58 includes payment completion information included in the purchase request message in a payment acknowledge request message, and transmits the payment acknowledge request message to the payment gateway. Then, the payment processing unit 58 receives a payment acknowledge message from the payment gateway, and checks whether payment certification information is included in the payment acknowledge message. If payment certification information is included in the payment acknowledge message, the payment processing unit 58 performs processing for sending the selected product.

The server according to another general aspect transmits sales information of a product in the form of a barcode to a broadcasting station server, and the server according to a general aspect transmits product information to a broadcasting station server.

FIG. 6 illustrates a mobile terminal 60 according to a general aspect. Referring to FIG. 6, the mobile terminal 60 includes a short message processing unit 62, a sales authority authentication unit 63, a sales information storage unit 64, a payment processing unit 65, a payment information storage unit 66, and a purchase request unit 67. The mobile terminal 60 may include a signal transceiver 61. The signal transceiver 61 transmits or receives signals wirelessly between the mobile terminal 60 and a mobile communication network or between the mobile terminal 60 and an IPTV 20.

The purchase request unit 67 transmits to the IPTV 20 product information selected by a user through the IPTV 20, and purchaser identification information, or binds product information selected by a user through the IPTV 20, and purchaser identification information, to create binding information, and transmits the binding information directly to the server 50 through the mobile communication network. At this point, the purchaser identification information transmitted to the IPTV 20 may be a number corresponding to purchaser information. The purchaser information may be the purchaser's resident registration number, the purchaser's address, a credit card number, or an identification number of the mobile terminal 60.

The short message processing unit 62 stores sales information included in the short message received from the server in the sales information storage unit 64, and transmits authentication information of the server included in the sales information to the sales authority authentication unit 63. The sales information may include product information, information about a payment method, and the server's authentication information. Accordingly, the sales authority authentication information unit 63 determines a sales authority of the server using the received authentication information of the server and prestored authentication information of the server. That is, the sales authority authentication unit 63 determines that the server has a valid sales authority if the received authentication information of the server is equal to the prestored authentication information of the server, and determines that the server does not have a valid sales authority if the received authentication information of the server is not equal to the prestored authentication information of the server.

Thereafter, if the server has a valid sales authority, the payment processing unit 65 generates payment information for the selected product, using a payment method prestored in the payment information storage unit 66 and payment information included in the sales information. The payment processing unit 65 includes the payment processing information in a payment message, and transmits the payment message to a payment gateway.

The payment method may be a mobile payment method. The mobile payment method includes a mobile banking payment method which makes payments through a bank, and a mobile card payment method which makes payments through a card company. The payment information may include a user's resident registration number, a user's bank account number and password, and a user's credit card number and credit card password, wherein the user is an owner of the mobile terminal. However, the payment information may include any other information.

Accordingly, the payment information may include the amount to be paid to purchase the product, and a bank account number and password, or include the amount to be paid to purchase the product, and a credit card number and credit card password. Payments for purchasing the product are made using prestored payment information. Accordingly, a user may not need to input payment information required for purchasing the product through a separate input apparatus whenever he or she purchases a product.

If the payment processing unit 65 receives a payment certification message from the payment gateway, the payment processing unit 65 generates a purchase request message for the selected product, and transmits the purchase request message to the server. The purchase request message may include payment completion information. That is, the payment processing unit 65 transmits the payment request message to the payment gateway, not via the server, so that the payment gateway makes payments for purchasing the product. Accordingly, it is possible to prevent payment information from being compromised when the server is managed by a malicious user.

The mobile terminal according to another general aspect captures and acquires sales information of a product which is displayed on the screen of the IPTV, using a camera, determines a sales authority using the sales information, and issues a purchase request and makes payments for purchasing the product if the sales authority is valid. The mobile terminal according to a general aspect determines a sales authority using sales information included in a short message received from a server, and issues a purchase request and makes payments for purchasing the product if the sales authority is valid.

As described above, in an electronic commerce method and system using an IPTV and a mobile terminal according to a general aspect, by allowing the mobile terminal to acquire sales information of a product selected through the IPTV and to make an offer to purchase the product using the sales information, it is possible to purchase a product while watching a broadcasting program, without any interruption. Also, in the electronic commerce method and system using the IPTV and the mobile terminal according to a general aspect, since a user purchases a product using payment information prestored in the mobile terminal, he or she may not need to input payment information through a separate input apparatus.

Furthermore, in the electronic commerce method and system using the IPTV and the mobile terminal according to a general aspect, by making payments for purchasing a product through a payment gateway, it is possible to prevent personal information leaks to malicious users. Also, in the electronic commerce method and system using the IPTV and the mobile terminal according to a general aspect, since a server determines a purchase authority using a hardware ID of a set-top box or the mobile terminal's identification number which is received from the set-top box of the IPTV or from the mobile terminal, it is possible to protect the server from DoS attacks of malicious users.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of general aspects have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An Internet Protocol Television (IPTV) set-top box comprising:
   a receiver configured to receive, from a mobile terminal, purchaser identification information, purchaser information corresponding to the purchaser identification information, and product information captured from the IPTV;
   a binding unit configured to create binding information, which comprises the captured product information, the purchaser information, a hardware identifier (ID) of the set-top box, and the purchaser identification information; and
   a transmitter configured to transmit the binding information to a server.

2. The IPTV set-top box of claim 1, wherein the binding unit is further configured to recognize and use the purchaser information.

3. The IPTV set-top box of claim 1, wherein the binding unit is further configured to:
   store the purchaser information and the purchaser identification information that are input from the mobile terminal; and
   match the purchaser identification information to the purchaser information.

4. The IPTV set-top box of claim 1, wherein the binding unit is further configured to store the binding information.

5. A mobile terminalcomprising:
   a purchase request unit configured, within the mobile terminal, to transmit purchaser identification information, purchaser information corresponding to the purchaser identification information, and product information captured from an Internet Protocol Television (IPTV) to a server via a set-top box of the IPTV, wherein the set-top box is configured to create binding information that comprises the purchaser identification information, the purchaser information, the captured product information, and a hardware identifier (ID) of the set-top box, and to send the binding information to the server;
   a sales authority authentication unit configured, within the mobile terminal, to determine a product sales authority of the server using sales information received from the server; and
   a payment processing unit configured, within the mobile terminal, to make an offer to purchase a product related to the captured product information to the server, using the sales information and payment information corresponding to the purchaser information, in response to the product sales authority being determined to be valid.

6. The mobile terminal of claim 5, wherein the purchase request unit is further configured to transmit the captured product information, the purchaser information, and the purchaser identification information to the server via a mobile communication network, the set-top box of the IPTV, an Internet connection, or any combination thereof.

7. The mobile terminal of claim 6, wherein the purchaser identification information comprises a number corresponding to the purchaser information.

8. The mobile terminal of claim 5, wherein the purchaser information includes at least one of the purchaser's resident registration number, the purchaser's address, the purchaser's credit card number, and the identification number of the mobile terminal.

9. The mobile terminal of claim 5, wherein the sales information includes the captured product information, information about a payment method, authentication information of the server, or any combination thereof.

10. The mobile terminal of claim 5, wherein the sales authority authentication unit is further configured to determine the product sales authority using the sales information, the sales information being received in a short message from the server.

11. The mobile terminal of claim 5, wherein the prestored payment information includes a resident registration number, a bank account number, a credit card number, or any combination thereof.

12. A server comprising:
   an authentication unit configured to determine a purchase authority using binding information received from an Internet Protocol Television (IPTV) set-top box where a purchaser selects, via a mobile terminal, a product related to product information captured from the IPTV by the mobile terminal, wherein
      the binding information comprises purchaser identification information, purchaser information corresponding to the purchaser identification information, a hardware identifier (ID) of the set-top box, and the captured product information of the selected product;
   a sales information transmitting unit configured to transmit sales information for the selected product to the mobile terminal or the IPTV set-top box in response to the purchase authority being determined to be valid; and
   a purchase processing unit configured to:
      receive a purchase request message from the mobile terminal where payments for the product are complete; and
      perform processing for sending the product for which the payments are complete.

13. The server of claim 12, wherein the binding information comprises the captured product information of the selected product, identification information of the IPTV set-top box, the purchaser information, or any combination thereof.

14. The server of claim 13, wherein the authentication unit is further configured to determine the purchase authority using the identification information of the IPTV set-top box among the binding information received from the IPTV set-top box.

15. The server of claim 12, wherein the authentication unit is further configured to determine the purchase authority using mobile binding information received from the mobile terminal, the mobile binding information including the captured product information for the selected product, the purchaser information, or the combination thereof.

16. The server of claim 15, wherein the authentication unit is configured to determine the purchase authority using the purchaser information among the binding information received from the mobile terminal, the purchaser information including the purchaser's resident registration number, the purchaser's address, the purchaser's credit card number, the identification number of the mobile terminal, or any combination thereof.

17. The server of claim 12, wherein the sales information includes the captured product information, information about a payment method, authentication information of the server, or any combination thereof.

18. The server of claim 12, wherein the sales information transmitting unit is further configured to transmit the sales information for the captured product information to the mobile terminal, using a short message.

19. An electronic commerce method of an Internet Protocol Television (IPTV) set-top box, the method comprising:
- receiving, with the set-top box and from a mobile terminal, purchaser identification information, purchaser information corresponding to the purchaser identification information, and product information captured from the IPTV;
- creating binding information, with the set-top box, the creating of the binding information comprising binding the captured product information, the purchaser information, the purchaser identification information, and a hardware identifier (ID) of the set-top box; and
- transmitting, with the set-top box, the binding information to a server to allow the user to purchase a product related to the captured product information.

20. An electronic commerce method of a mobile terminal, the method comprising:
- transmitting, by the mobile terminal, purchaser identification information, purchaser information corresponding to the purchaser identification information, and product information captured from an Internet Protocol Television (IPTV) to a set-top box of the IPTV;
- transmitting, by the set-top box, binding information to a server, wherein the set-top box is configured to create the binding information that comprises the purchaser identification information, the purchaser information, the captured product information, and a hardware identifier (ID) of the set-top box;
- determining, by the mobile terminal, a product sales authority of the server using sales information received from the server; and
- making, by the mobile terminal, an offer to purchase a product related to the captured product information to the server, using the sales information and payment information corresponding to the purchaser information, in response to the product sales authority being determined to be valid.

21. The method of claim 20, wherein the purchaser identification information, the purchaser information, and the captured product information is transmitted to the server via the IPTV set-top box, an Internet connection, a mobile communication network, or any combination thereof.

* * * * *